SEALING RING, MORE PARTICULARLY FOR MACHINE PARTS
Filed July 25, 1966
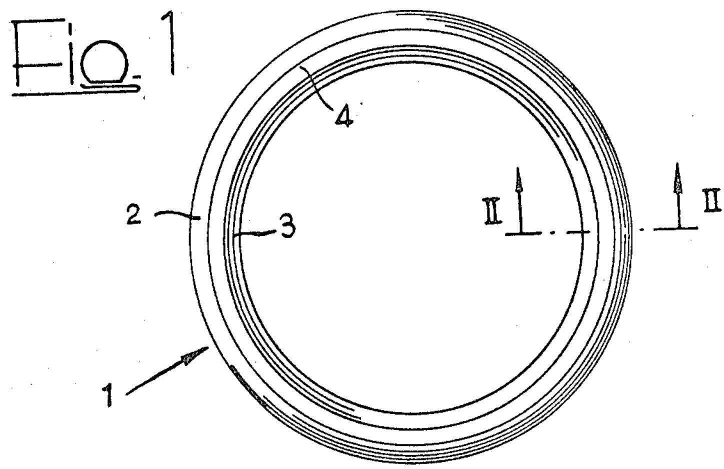
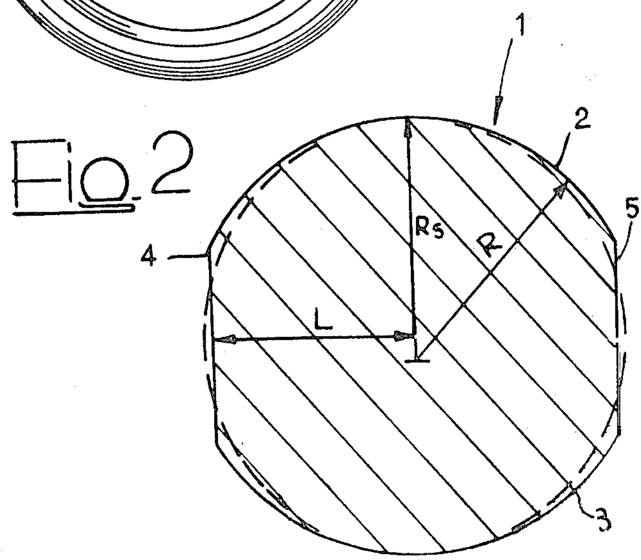
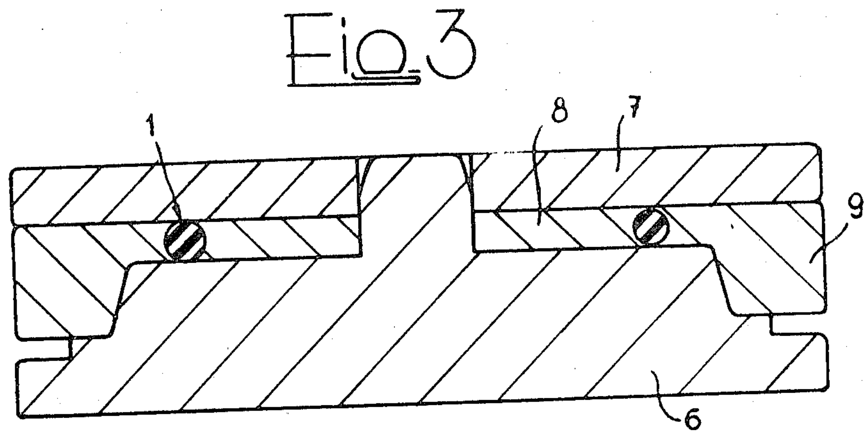

United States Patent Office 3,528,669
Patented Sept. 15, 1970

3,528,669

SEALING RING, MORE PARTICULARLY FOR MACHINE PARTS

Carlo F. Tondato, Turin, Italy, assignor to Firgat S.n.c., Turin, Italy

Filed July 25, 1966, Ser. No. 567,658
Claims priority, application Italy, July 31, 1965, 17,938/65
Int. Cl. B65d *53/02;* F16j *15/10*
U.S. Cl. 277—237 3 Claims

ABSTRACT OF THE DISCLOSURE

A sealing ring having two smooth unblemished arcuate faces interconnected by two spaced parallel flat sections substantially perpendicular to the ring axis. The ring being molded of resilient material, such as polyurethane, to provide the two unblemished arcuate sections that do not require machining to remove any burs or flashings.

The present invention relates to sealing rings, more particularly for use on machine parts and of the type known as O-rings.

Known O-rings are presently manufactured in divided molds, each mold half being formed with a circular groove in which one ring half is molded, the two mold halves being juxtaposed substantially in the equatorial plane of the ring. However, use of the above type of mold for forming rings of circular cross sectional shape, necessitates additional finishing of the ring. Such finishing is intended to remove the burrs which tend to be formed at the joint of the mold and are of course effected after molding. As will be obvious this extra work is undesirable, as it increases the cost of the product and often impairs the quality of the ring by uncovering any porosity in the material which would otherwise remain sealed as a result of contact with the inner surface of the vulcanizing mold. This is particularly objectionable in that the region of the outer surface of the O-ring that is thus damaged, is just that region which, in use, is required to adhere to the cylindrical surfaces of the machine parts to which it is fitted or to establish a sliding contact therewith where this is called for.

An object of the present invention is accordingly to provide a sealing ring of such structure that its surfaces are perfectly smooth at the region of its outer circumference which establishes a static or sliding contact with the cylindrical surfaces of the machine parts to which it lies adjacent in use, the ring being moreover cheaper to manufacture than a conventional O-ring.

Another object of the invention is to provide a sealing ring in which the outer circumferential portion of the profile of its cross section which establishes the static or sliding contact with the cylindrical surfaces of the machine parts, is less sharply curved than the corresponding profile of a circular sealing ring of conventional type, which conventional ring is of the same height as measured in the equatorial plane of the ring.

A further object of the invention is to provide a sealing ring, more particularly for use on machine parts, the said ring being formed from resilient material, for instance an injection-moldable polyurethane, and the profile of the cross section of the ring including two rectilinear parallel spaced sections located substantially perpendicular to the ring axis and two arcuate sections having their convexity turned towards the ring exterior and the ring axis, respectively, the said sections interconnecting the ends turned in the same direction as the said rectilinear sections.

According to a preferred object of the invention, the centers of curvature of the arcuate sections of the profile of the sealing ring are situated in the symmetry axis of the ring section profile, the radius R of the curvature of each of said sections being expressed by the following formula:

$$R=Rs+7\%\ Rs=1.07\ Rs$$

wherein $Rs$ is the radius of the cross section of the circular sealing ring of the same height measured in the direction of the equatorial plane of symmetry of the ring.

According to a further preferred object of the invention, the spacing (21) of the rectilinear sections of the profile of the sealing ring is expressed by the following formula:

$$2L=2(Rs-7\%\ Rs)=1.86\ Rs$$

These and other objects and advantages of the invention will be clear from the following description, given with reference to the accompanying drawings, which are by way of example and in which:

FIG. 1 is a plan view of a sealing ring according to the invention;

FIG. 2 is a sectional view on an enlarged scale taken along the line II—II of FIG. 1, the section shown having been turned through 90° with respect to the section lines of FIG. 1;

FIG. 3 is an axial sectional view through a mold suitable for manufacturing a sealing ring according to the invention, the mold being shown during manufacture of the ring.

In the drawings, a ring according to the invention is generally denoted by reference numeral 1. The ring includes on its outer circumference and its inner circumference surface 2, 3, respectively, the said surfaces being of arcuate profile in cross section. The surfaces 2, 3 are interconnected by flat lateral surfaces 4, 5, respectively.

The curvature of the profile in cross section of each of the surfaces 2, 3 is such that their radii of curvature R may each be expressed by the formula:

$$R=Rs+7\%\ Rs=1.07\ Rs$$

wherein $Rs$ is the radius of the cross section of a circular sealing ring having the same height measured in the direction of the equatorial plane of symmetry of the ring. Such a ring is represented by dotted lines in FIG. 2.

The spacing (2L) of the flat annular surfaces 4, 5 is expressed by the formula:

$$2L=2(Rs-7\%\ Rs)=1.86\ Rs$$

wherein $Rs$ is of the above mentioned value.

As will be seen in FIG. 3, a mold for manufacturing a ring according to the invention by vulcanization with the action of heat and pressure may conveniently be formed from four sections 6, 7, 8, 9, respectively. The said sections are juxtaposed inter alia in planes arranged on the extension of the surfaces of the mold sections, which form the flat surfaces 4, 5 of the sealing ring.

This dispenses with the need for finishing operations on the molded ring. Some trimming may of course be carried out as is found necessary, but such trimming does not involve the regions of the sealing ring which are adapted to come into static or sliding contact with cylindrical surfaces of the machine elements in which the ring is to be assembled.

Various modifications to the invention are of course possible within the scope of the appended claims.

What is claimed is:

1. A sealing ring comprising; a generally annular ring of resilient material, a cross-sectional profile of the ring including two spaced parallel flat sections perpendicular to the ring axis and two spaced arcuate sections interconnecting the flat sections and having smooth unblemished surfaces on the inner and outer faces of the ring for providing sealing contact, wherein the centers of curvature of the arcuate sections are situated on the axis of symmetry of the ring section profile, the value of the radius R of curvature of each of the arcuate sections being expressed by the formula:

$$R \cong Rs + 7\%\ Rs \cong 1.07\ Rs$$

wherein $Rs$ is the radius of a circle having a diameter equal to the maximum height of the sealing ring cross-section perpendicular to the axis of the ring.

2. A sealing ring as in claim 1, wherein the spacing 2L of the two rectilinear sections is expressed by the following formula:

$$2L \cong 2(Rs - 7\%\ Rs) \cong 1.86\ Rs$$

3. A sealing ring as in claim 1 formed from injection-moldable polyurethane.

References Cited

UNITED STATES PATENTS

| | | | |
|---|---|---|---|
| 1,976,589 | 10/1934 | Trickey | 277—237 X |
| 2,488,807 | 11/1949 | Currie. | |
| 3,148,888 | 9/1964 | Clark et al. | |

FOREIGN PATENTS

| | | |
|---|---|---|
| 647,450 | 8/1962 | Canada. |

OTHER REFERENCES

Hydraulics and Pneumatics, How Compression Set Affects O-Ring Selection, C. R. St. Amour, April 1966, pp. 132–134.

Durametallic Packings (Catalog), September 1934, pp. 6–8, Dura Plastic.

LAVERNE D. GEIGER, Primary Examiner

J. S. MEDNICK, Assistant Examiner

U.S. Cl. X.R.

277—207